July 2, 1968  F. J. BROWN ETAL  3,390,866
APPARATUS FOR AGITATING ARTICLES
Filed Aug. 8, 1967  2 Sheets-Sheet 1
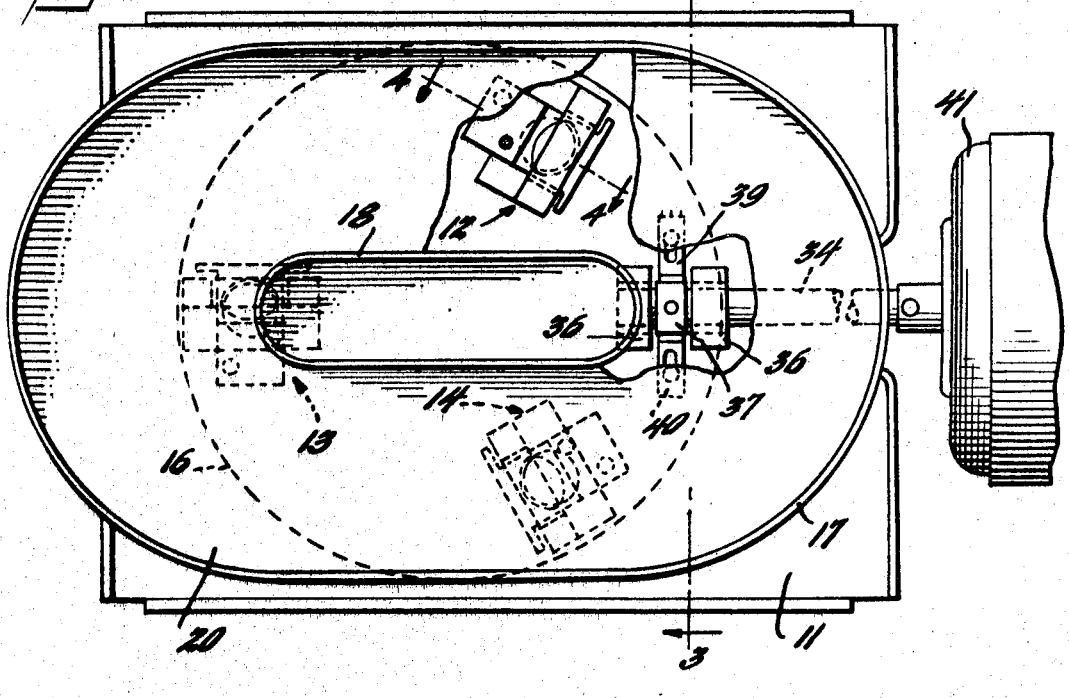
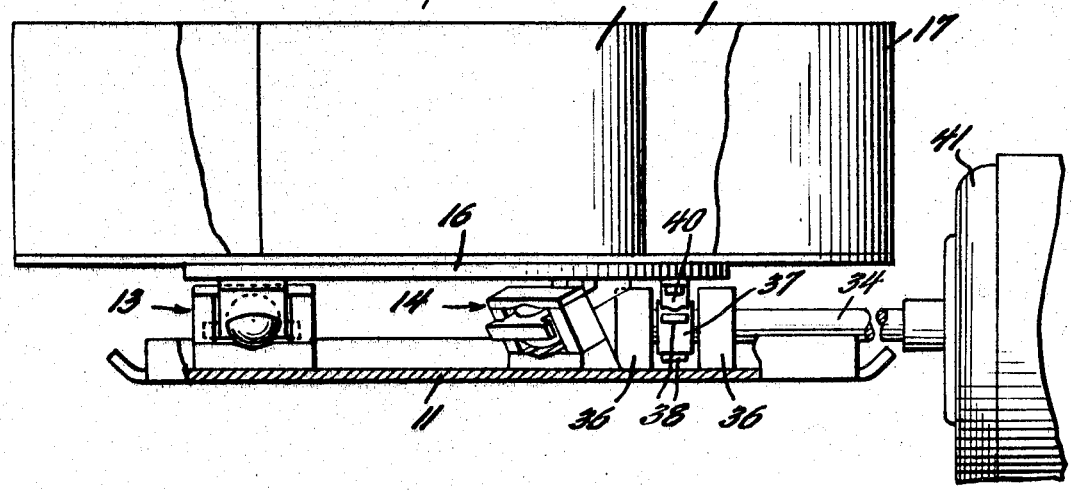
Inventors
Ford J. Brown
George D. Kellner
By R. P. Miller
Attorney

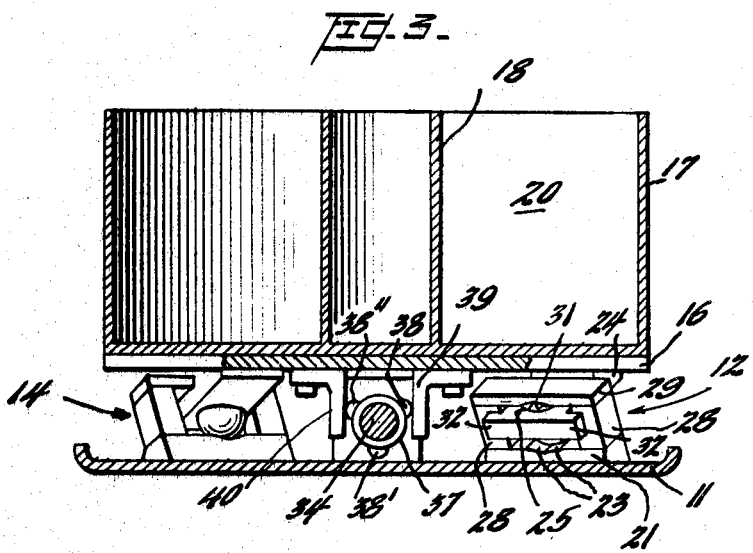
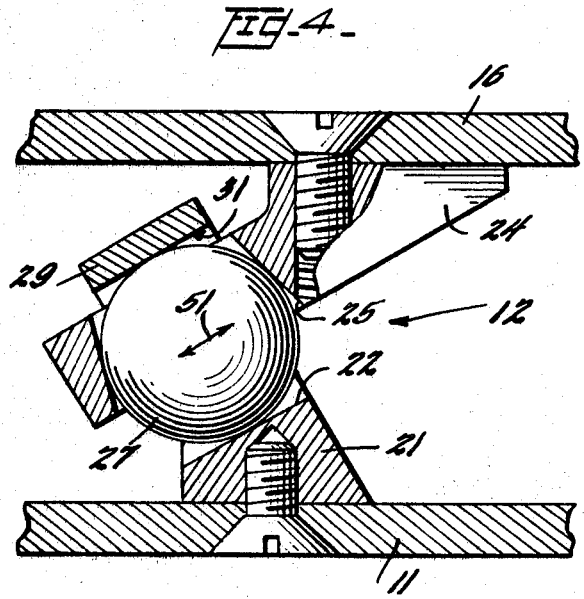

United States Patent Office 3,390,866
Patented July 2, 1968

3,390,866
APPARATUS FOR AGITATING ARTICLES
Ford J. Brown, Kutztown, and George D. Kellner,
Tamaqua, Pa., assignors to Western Electric Company, Incorporated, New York, N.Y., a corporation of New York
Filed Aug. 8, 1967, Ser. No. 659,163
10 Claims. (Cl. 259—72)

ABSTRACT OF THE DISCLOSURE

An article agitating apparatus has a container which is movably mounted by a plurality of support devices equidistantly spaced from the center of the container. The supports limit the container to movement in a helical path so that upon application of lateral vibratory forces to the container, the container is reciprocated in a helical path to agitate articles held therein.

Cross reference of related application

In an application by F. J. Brown, R. W. Davies, and G. D. Kellner entitled "Agitating a Batch of Articles During Heat Treatment to Prevent Thermal Bonding of the Articles," a method of and apparatus for agitating articles during heat treatment to prevent undesired thermal bonding is disclosed.

Background of the invention

In the heat treatment of a batch of workpieces, such as iron-nickel contacts for sealed contact switches, it is desirable to agitate the workpieces during the heat treatment in order to prevent the articles from bonding together. Thus, a vibratory apparatus capable of imparting sufficient agitated motion to the workpieces to prevent bonding of the workpieces at elevated temperatures is required. In order to preclude bonding, the workpieces should be subjected to both horizontal and vertical forces which act to move workpieces relative to each other.

Summary of the invention

The present invention contemplates workpiece agitating apparatus wherein a container is vibrated in helical fashion to preclude the bonding of the workpieces when subjected to elevated temperatures. The apparatus may include an oval pan or container movably mounted upon a plurality of supports spaced about the center of the container. Each support is designed to prescribe limitations on the horizontal and vertical movement of the container. The supports are arranged in a circular pattern beneath the container to limit movement of the container to helical motion about a point at its center.

Horizontal vibratory forces are applied to the container by a camming roller, mounted on a rotating shaft, which alternately engages a pair of brackets, mounted to the bottom of the container and spanning the camming roller. The supports convert the horizontal vibratory forces into reciprocal helical motion of the container to agitate the workpieces held therein.

Brief description of the drawing

FIG. 1 is a plan view of the vibratory apparatus of the present invention illustrating an oval container mounted to a base by a plurality of supports positioned in a circular pattern about the center of the container;

FIG. 2 is a side view of the vibratory apparatus of FIG. 1;

FIG. 3 is a sectional view, taken along line 3—3 of FIG. 1, illustrating a pair of brackets mounted to the bottom of the container which cooperate with a camming roller to exert horizontal vibratory forces on the container; and FIG. 4 is a sectional view, taken along line 4—4 of FIG. 1, of one of the supports.

Detailed description

The vibratory apparatus of the present invention includes a base 11 (FIGS. 1 and 2) on which a plurality of support devices 12, 13, and 14 are mounted in a circular pattern. A circular plate 16 is mounted to the support devices 12, 13, and 14 such that the center point of the circular plate 16 is equidistant from each of the support devices. An oval container 17 is secured to the top of the circular plate 16 such that its center point is also centrally located with respect to the supports 12, 13, and 14. The container 17 includes an oval divider 18 located about its center to define an oval space or track 20 (FIG. 1) between the divider and the inner wall of the container 17 for receiving articles.

As shown in FIGS. 3 and 4, the support device 12, which is identical to support devices 13 and 14, includes a block 21 attached to the base 11. The block 21 has a groove 22 formed in its upper inclined surface by a pair of inclined surfaces 23 (FIG. 2). An arm 24, fastened to the circular plate 16, projects downward toward the support block 21 at an angle which is substantially parallel to the inclined groove 22. The arm 24 has a conical bore 25 therethrough for receiving a spherical member or bearing 27. The bearing 27 is supported in the groove 22 by the inclined surfaces 23, and the arm 24 is pivotally supported by the surface of the bearing 27.

The support 12 also includes a pair of struts 28 (FIG. 3), mounted to the support member 21 on opposite sides of the groove 22, projecting upward toward the circular plate 16. A spanning bar 29 is secured to the struts 28, as shown in FIG. 3. The spanning bar also has an inclined groove 31 formed therein which is parallel to the inclined groove 22 of the support block 21.

The support block 21, the struts 28, and the spanning bar 29 form a canted housing having a rectangular opening into which the arm 24 and the bearing 27 are received. The bearing 27 is of sufficient size to be received in the conical bore 25 such that portions thereof extend from opposite sides of the arm 24 (FIG. 4) and fit into both of the inclined grooves 22 and 31. Movement of the bearing 27 is limited to rolling motion in a straight line along the inclined surfaces 23 of the groove 22. When the bearing 27 is rolled upward along the inclined surfaces 23, for example, then the arm 24 tends to move in an upward direction. At the same time, however, the arm 24 pivots over the curved surface of the bearing 27 to impart a rotational component of motion to the plate 16. The rotational component results from the circular arrangement of the support devices 12, 13, and 14. The straight line, rolling motion of the bearings 27, associated with each of the support devices, is converted into such rotational motion because each of the arms 24 is rigidly fixed to the circular plate 16 and arranged tangentially with respect to the center of the circular plate 16. Thus, when the bearings 27 are confined to roll in their respective grooves 22, the arms 24 are not free to follow the same straight line motion of the bearings 27 because of their common attachment to the plate 16. The arms 24 pivot over the spherical surfaces of the bearings 27 to move the plate 16 and the container 17 with rotational motion. This rotational motion combined with the upward movement of the arms 24 produces movement of the container 17 in a helical path about its center point.

As shown in FIG. 3, the arm 24 has a pair of lateral projections 32 which are normally spaced from the struts 28. The projections 32 limit the movement of the arm 24 and the bearing 27 relative to the support member 21 to prevent the bearing 27 from moving off the inclined surfaces 23.

Considering the mechanism for vibrating the container 17, a shaft 34 is shown in FIG. 1 as being rotatably mounted to the base 11 by a pair of bearings 36. A collar 37 (FIGS. 1–3) having a plurality of camming lobes 38, 38', and 38" equidistantly spaced about the periphery of the collar 37 is attached to the shaft 34. A pair of spaced, L-shaped brackets 39 and 40 project downward from the circular plate 16 and span the roller 37 and camming lobes. The brackets 39 and 40 are spaced from the periphery of the roller 37 and are alternately engaged by the camming lobes 38, 38', and 38" when the shaft 34 and the collar 37 are rotated. As shown in FIGS. 1 and 2, a motor 41 is connected to the shaft 34 and is used to rotate the shaft 34, the collar 37, and the camming lobes.

In the operation of the apparatus, a batch of articles, such as iron-nickel contacts, is first loaded into the oval track 20 of the container 17. Then the apparatus is moved into a furnace to subject the articles to an elevated temperature. If the articles remain in stationary contact while subjected to the elevated temperature, then thermal bonding occurs between adjacent, overlapping articles which renders the batch of articles unsuitable for further processing. For example, in the case of iron-nickel contacts, at a temperature of 1100° F. only a few seconds of stationary contact are necessary to produce thermal bonds between the contacts. At a temperature of 1500° F., the bonding is almost instantaneous. For this reason, it is necessary to agitate the contacts during heat treatment to prevent thermal bonding of the contacts.

First, the motor 41 is energized to rotate the shaft 34, the collar 37 and the camming lobes 38 in a clockwise direction as viewed in FIG. 3. As the collar 37 rotates, the camming lobes 38, 38', and 38" are moved successively into engagement with the bracket 39 and then the bracket 40. The spacing of the brackets and the arrangement of the camming lobes are such that the brackets are alternately engaged by the advancing lobes. The action of the camming lobes 38, 38', and 38" against the brackets 39 and 40 imparts lateral vibratory forces to the container 17 which tend to reciprocate the container 17 from side to side, in a horizontal plane.

Because of the limitations on its motion imposed by the support devices 12–14, the container 17 is not capable of such simple periodic motion, i.e., from side to side. As noted above, each support limits its associated spherical member or bearing 27 to movement in a straight line along the surfaces of the inclined groove of its support block as indicated by arrow 51 (FIG. 4). However, since the arms 24 are rigidly fastened to the circular plate 16, the arms 24 are not free to move independently of one another. As the bearings 27 move upwardly in the inclined grooves 22, the arms 24 also tend to move upwardly, but as a result of their rigid attachment to the plate 16 none of the arms 24 can follow the motion of its associated bearing 27 so that the arms 24, as viewed in FIG. 1, pivot on the bearings 27 in a counterclockwise direction. This counterclockwise pivoting motion is transmitted to the plate 16 resulting in a counterclockwise rotation thereof.

Since the bottom of the container 17 is fixed to the plate 16, the motion transmitted to the container 17 by the supports 12–14 has a circular component which tends to rotate the container 17 about its center point. At the same time, there is a vertical component of motion transmitted to the container 17 resulting from the movement of the spherical members along the inclined grooves of the support members. Thus, the motion imparted to the container 17 through the supports 12–14 includes both vertical and rotational components, and the container 17 tends to move in a helical path about its center point.

Considering the operation in more detail, assume that the shaft 34 (FIG. 3) is rotating in a clockwise direction. The camming lobe 38 moves into engagement with the bracket 39 and applies a pushing force thereto which moves the bracket 39 to the right. This pushing force is transmitted to the circular plate 16. Since the plate 16 is limited to rotational motion about its center point and vertical motion relative to the base 11, the pushing force applies a moment to the plate 16 which tends to move it in a counterclockwise direction (FIG. 1). The counterclockwise moment applied to the plate 16 results in forces applied to the spherical members 27, through the arms 24 projecting from the plate 16, which move the spherical members in their respective inclined grooves. This movement of the spherical members results in a movement of the arms 24 which has both vertical and rotational components.

The vertical movement of the arms 24 is transmitted directly to the plate 16 and the container 17 to lift the container 17 relative to the base 11. The rotational movement of the arms 24 results in motion of the plate 16 and the container 17 because of the circular arrangement of the supports 12–14. As the spherical members move upward along their inclined grooves, the circular plate 16 and the container 17 rotate in a counterclockwise direction (FIG. 1) and move upward relative to the base 11.

As the shaft 34 and the collar 37 continue to rotate, the camming lobe 38 is moved across the surface of the bracket 39, driving the bracket 39 to its extreme rightward position when the camming lobe is located directly between the shaft 34 and the bracket 39. At this point, the container 17 is located in its highest position and its counterclockwise rotation is completed. When the camming lobe 38 moves past this point, the weight of the loaded container 17 carries the arms 24 and spheroids 27 to move back down into the canted housings with the result that bracket 39 moves leftward and the container 17 begins to move downward with a clockwise rotation.

Next, the camming lobe 38' moves into engagement with the bracket 40 to exert a pushing force on the bracket 40 to move it to the left. As the rotation of the shaft 34 and the roller 37 continues, the bracket 40 is moved leftward and the downward, clockwise rotation of the container 17 is continued until the camming lobe 38' is located directly between the shaft 34 and the bracket 40. At this point, the container 17 is located in its lowest position and its clockwise rotation is completed. Finally, as the camming lobe 38' moves away from the bracket 40, the camming lobe 38" moves into engagement with the bracket 39 to initiate movement of the bracket 39 to the right whereby the container 17 begins to move upward, with a counterclockwise rotation. Further rotation of the shaft 34 and the roller 37 moves the camming lobe 38" across the surface of the bracket 39 and produces the same resulting movement of the container 17 as described above, with respect to the action of the camming lobe 38 and the bracket 39.

Thus, each of the camming lobes 38, 38', and 38" successively engages the brackets 39 and 40 to alternatively shift or reciprocate the brackets to impart both vertical and rotational motion to the container 17. The resultant motion of the container 17 relative to the base 11 is a combination of the vertical and rotational components and is best described as reciprocating helical motion about the center point of the container 17. This motion of the container 17 imparts both vertical and horizontal motion to the articles held therein to agitate the articles whereby thermal bonding is prevented during heat treatment of the articles.

If the speed of rotation of the shaft 34 is sufficiently high (e.g., 500 r.p.m.), then the reciprocating movement of the container 17 agitates the articles held therein to prevent bonding of the articles when subjected to elevated temperatures within the furnace. Obviously, the speed of rotation to prevent bonding of the articles is dependent upon the composition of the articles and the temperature of the furnace. The curved shape of the container 17 and the divider 18 permit the articles to move freely about the bottom of the container 17 without bunching together.

The combined vertical and rotational movement can be imparted to the container 17 by using a single depending bracket, such as bracket 39. In this instance, the cam surfaces 38 strike the bracket to impart the helical motion in a counterclockwise direction, and the clockwise helical motion is attained by gravity acting on the loaded container to move the container back to its lower position.

The above-described apparatus merely exemplifies the principles of the present invention. Persons having ordinary skill in the art may modify the apparatus without departing from the scope of the invention.

What is claimed is:

1. In an apparatus for agitating articles:
 a base;
 a container for receiving articles;
 a plurality of arms connected to the bottom of said container and arranged about a center point to extend in a common angular direction from said bottom of said container;
 means on said base mounting each of said arms for linear movement and for rotation relative to said base to confine said container to move in a helical path; and
 means for intermittently imparting lateral forces to said bottom of said container to reciprocate said container in a helical path.

2. In an apparatus for agitating articles:
 a base;
 a container for receiving the articles;
 a plurality of arms projecting angularly from the bottom of said container, said arms being equidistantly spaced about the center of said container and having conically shaped openings therein;
 spherical members positioned within said conically shaped openings for engaging the side walls of said openings and pivotally supporting said arms;
 a plurality of support blocks mounted to said base in a circular pattern, each of said blocks having an inclined surface for supporting said spherical members for movement therealong; and
 means for applying lateral vibratory forces to said container to impart rolling motion to said spherical members along said inclined surfaces whereupon said arms pivot over the surfaces of said spherical members to impart reciprocating movement in a helical path to said container to agitate the articles.

3. In an apparatus for agitating articles, as set forth in claim 2, wherein the means for applying vibratory forces to the container comprises:
 a shaft rotatably mounted to said base beneath said container;
 a roller mounted to said shaft having at least one camming lobe projecting from its surface;
 first and second members projecting from the bottom of said container and spanning said roller and camming lobe; and
 means for rotating said shaft and said roller to bring said camming lobe alternately into engagement with said first and second members to apply vibratory forces to said container to impart reciprocating movement in a helical path to said container whereby the articles are agitated.

4. In an apparatus for agitating articles:
 a base;
 a container for receiving the articles;
 a plurality of supports, equidistantly spaced from a common point, for movably mounting said container to said base, said supports limiting said container to reciprocating movement in a helical path about said common point;
 a bracket projecting from the bottom of said container;
 camming means rotatably mounted beneath said container and engaging said bracket for applying lateral forces thereto; and
 means for rotating said camming means to apply lateral forces intermittently to said bracket to impart reciprocating movement in a helical path to said container whereby the articles are agitated.

5. In an apparatus for agitating articles:
 a base;
 a container for receiving the articles;
 a plurality of arms, each having a conical opening therethrough, secured to the bottom of said container and projecting downward at an angle therefrom, said arms being arranged in a circular pattern and projecting tangentially from said container with respect to said circular pattern;
 spherical members positioned within said conical openings for engaging the side walls of said openings to pivotally support said arms, each spherical member having a diameter such that a portion of its curved surface projects outward from said conical opening;
 a plurality of canted housings mounted on said base in a circular arrangement, each of said housings having a rectangular opening for receiving said spherical members and arms and an inclined surface within said opening for supporting said projecting portions of said spherical members for rolling movement therealong; and
 means for applying lateral vibratory forces to said container to impart rolling motion to said spherical members along said inclined surfaces whereupon said arms move in said rectangular openings relative to said canted housing and pivot over the curved surfaces of said spherical members to impart reciprocating movement in a helical path to said container to agitate the articles.

6. In an apparatus for agitating articles, as set forth in claim 5, wherein:
 each of said arms is provided with a pair of projections extending from opposite sides thereof and spaced from said canted housing for limiting the movement of said arms through said rectangular openings in said canted housings.

7. In a support for mounting a container to move relative to a base:
 a spherical member;
 a first member mounted to the container and having an opening formed therein for receiving said spherical member with a portion projecting therefrom; and
 a second member mounted to the base and having an inclined surface for supporting said projecting portion of said spherical member to guide said spherical member to move along said inclined surface.

8. In a support for mounting a container to move relative to a base, as set forth in claim 7, wherein:
 said opening in said first member comprises a conical bore for receiving said spherical member.

9. In a support for mounting a container to move relative to a base, as set forth in claim 7, wherein:
 said first member comprises an arm projecting from the bottom of said container parallel to said inclined surface of said second member.

10. In a support for mounting a container to move relative to a base, as set forth in claim 7:
 means guiding said spherical member for movement in a straight line along said inclined surface.

References Cited

UNITED STATES PATENTS

| 3,067,495 | 12/1962 | Chase | 29—203 |
| 3,135,429 | 6/1964 | Anderson | 222—333 X |
| 3,257,040 | 6/1966 | Dumbaugh | 222—161 |
| 3,297,304 | 1/1967 | Wahl | 259—72 |

ROBERT W. JENKINS, *Primary Examiner.*